(12) United States Patent
Flagg et al.

(10) Patent No.: US 9,058,605 B2
(45) Date of Patent: Jun. 16, 2015

(54) SYSTEMS AND METHODS FOR SIMULATING ACCESSORY DISPLAY ON A SUBJECT

(75) Inventors: Matthew Flagg, San Diego, CA (US); Satya Mallick, San Diego, CA (US); David Kriegman, San Diego, CA (US)

(73) Assignee: TAAZ, INC., La Jolla, CA (US)

( * ) Notice: Subject to any disclaimer, the term of this patent is extended or adjusted under 35 U.S.C. 154(b) by 506 days.

(21) Appl. No.: 13/452,348

(22) Filed: Apr. 20, 2012

(65) Prior Publication Data
US 2013/0282344 A1    Oct. 24, 2013

(51) Int. Cl.
G06Q 30/00    (2012.01)
G06T 11/00    (2006.01)
G06T 15/50    (2011.01)
G06Q 30/02    (2012.01)

(52) U.S. Cl.
CPC ............... *G06Q 30/00* (2013.01); *G06T 11/00* (2013.01); *G06T 15/503* (2013.01); *G06Q 30/0276* (2013.01)

(58) Field of Classification Search
None
See application file for complete search history.

(56) References Cited

U.S. PATENT DOCUMENTS

| | | | |
|---|---|---|---|
| 7,106,343 B1* | 9/2006 | Hickman | 345/589 |
| 2003/0063105 A1* | 4/2003 | Agnew | 345/660 |
| 2004/0125423 A1* | 7/2004 | Nishi et al. | 358/537 |
| 2005/0203724 A1* | 9/2005 | Orpaz et al. | 703/6 |
| 2008/0120534 A1* | 5/2008 | Moore | 715/243 |
| 2010/0030578 A1* | 2/2010 | Siddique et al. | 705/3 |
| 2011/0096183 A1* | 4/2011 | Robertson | 348/222.1 |
| 2011/0216062 A1* | 9/2011 | Thomas-Lepore et al. | 345/420 |

OTHER PUBLICATIONS

Rousset, C. Grenoble INP, UJF, Grenoble Coulon, P.Y., Frequential and color analysis for hair mask segmentation, Oct. 12-15, 2008, Image Processing, 2008. ICIP 2008. 15th IEEE International 2276-2279.*

* cited by examiner

*Primary Examiner* — Maurice L McDowell, Jr.
(74) *Attorney, Agent, or Firm* — Cotman IP Law Group, PLC

(57) ABSTRACT

A method for simulating accessory display on a subject. An accessory is coupled with a mount with at least one contact portion configured to contact the accessory. The mount is positioned in at least one orientation with respect to an imaging device. At least one accessory image is captured of the accessory coupled with the mount in the at least one orientation using the imaging device. At least one accessory matte image is captured. At least one accessory foreground matte is generated for the at least one accessory. An accessory background matte is generated for the at least one accessory.

15 Claims, 12 Drawing Sheets

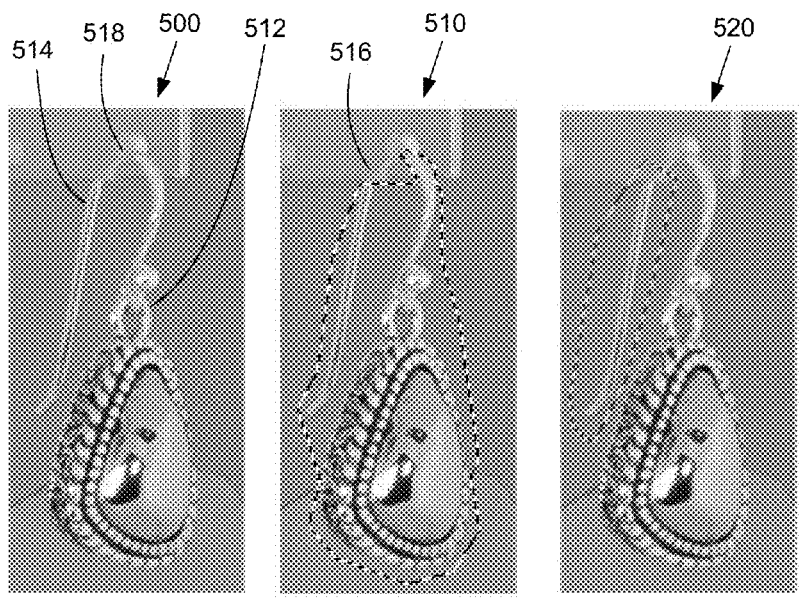
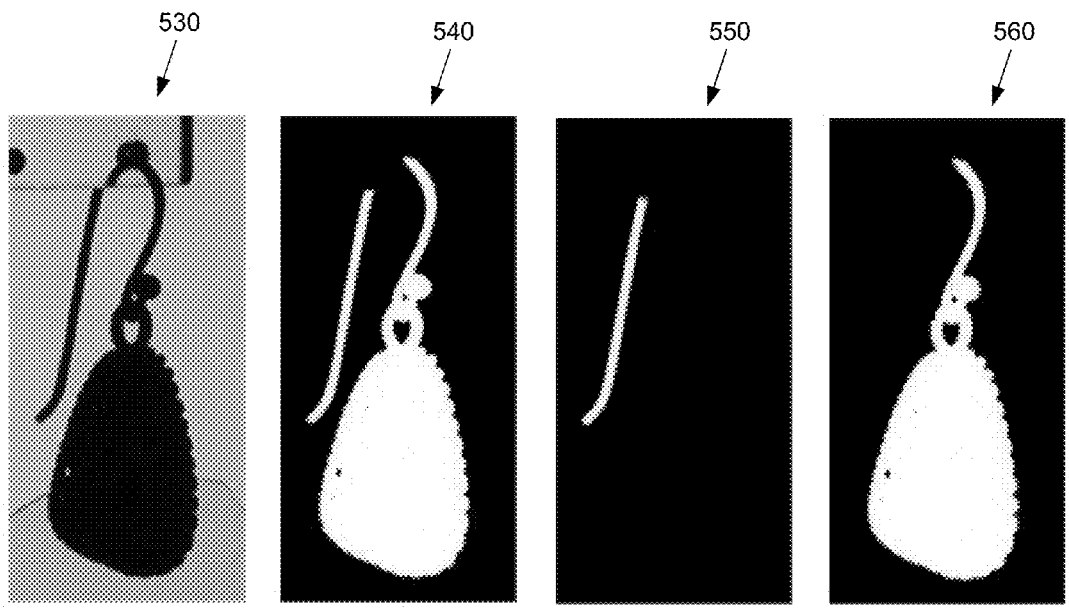
FIGURE 5A  FIGURE 5B  FIGURE 5C
FIGURE 5D  FIGURE 5E  FIGURE 5F  FIGURE 5G

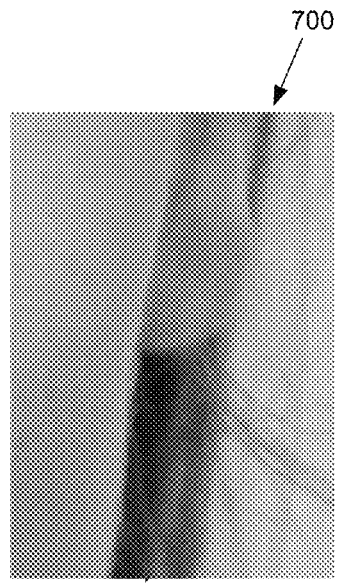
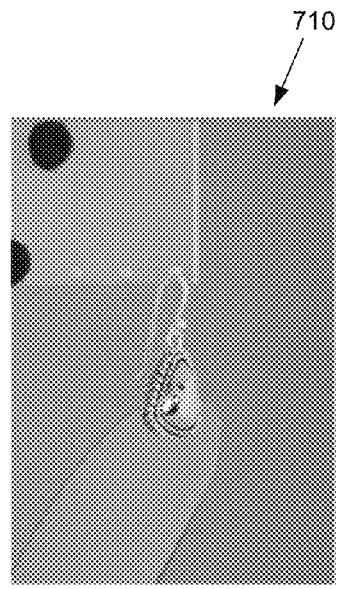
FIGURE 7A    FIGURE 7B
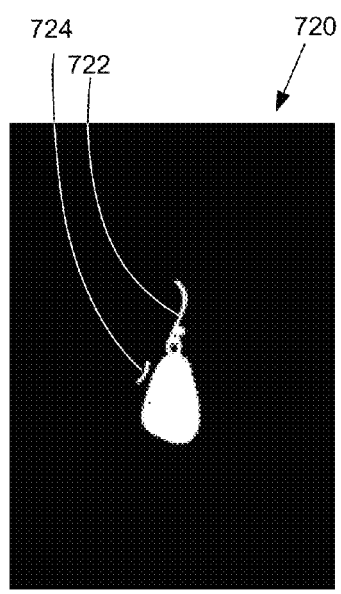
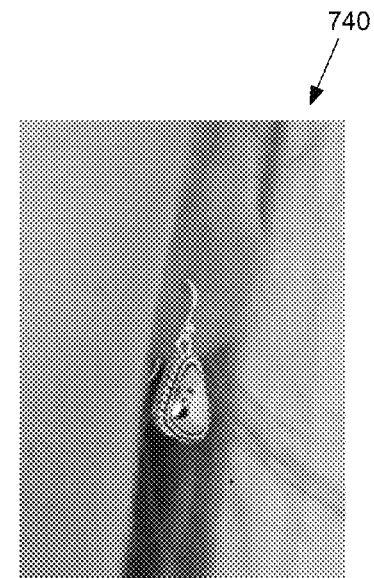
FIGURE 7C    FIGURE 7D    FIGURE 7E

SYSTEMS AND METHODS FOR SIMULATING ACCESSORY DISPLAY ON A SUBJECT

BACKGROUND OF THE INVENTION

1. Field of the Invention

Embodiments of the invention described herein pertain to the field of computer systems. More particularly, but not by way of limitation, one or more embodiments of the invention enable systems and methods for simulating accessory display on a subject.

2. Description of the Related Art

E-commerce has been steadily increasing with respect to a total market share of retail goods. Brick-and-mortar establishments offer consumers a more interactive experience. In a retail store, consumers can view goods in person. For fashion, including clothing, jewelry, and other accessories, consumers value the experience of being able to try on products.

There have been efforts to provide users an interactive e-commerce experience by allowing a user to view a simulation based on a photo of the user. Such efforts help bridge the gap between e-commerce portals and brick-and-mortar establishments, resulting in improved e-commerce sales. However, shortcomings in simulating the product on the consumer have limited the ability to provide a realistic simulation of a user wearing the product. These methods do not adequately take into account the position of portions of the product behind and in front of parts of the consumer that appear in a flattened photograph. The end result is a poor simulation that does not properly replicate the position of various components of the product.

It is also useful to simulate products on a model image. For example, simulating multiple products on a model image can reduce production costs and time. Simulating multiple products on the same image can also generate a more consistent and desirable user experience. However, imperfect simulations with artifacts limit the realistic simulation of products on a model image.

To overcome the problems and limitations described above, there is a need for systems and methods for simulating accessory display on a subject.

BRIEF SUMMARY OF THE INVENTION

Systems and methods for simulating accessory display on a subject are enabled that take into account proper layering between the accessory and a flattened photograph of a subject.

One or more embodiments of systems and methods for simulating accessory display on a subject are directed to a method for simulating accessory display on a subject.

The method includes coupling an accessory with a mount including at least one contact portion configured to contact the accessory. The accessory may be selected from a piercing accessory, a shoulder accessory, an arm accessory, a neck accessory, an ear accessory, a foot accessory, a wrist accessory and a finger accessory.

The method further includes positioning the mount in at least one orientation with respect to an imaging device. In one or more embodiments, the mount includes at least one transparent portion. The mount may be coupled with at least one reference marker positioned in view of the imaging device.

The method further includes capturing at least one accessory image of the accessory coupled with the mount in the at least one orientation using the imaging device. In one or more embodiments, capturing the at least one accessory image further includes using a diffuse light source.

The method further includes capturing at least one accessory matte image of the accessory coupled with the mount in the at least one orientation using the imaging device. In one or more embodiments, capturing the at least one accessory matte image further includes using a backlight source.

The method further includes generating at least one accessory foreground matte for the at least one accessory. In one or more embodiments, generating the at least one accessory foreground matte includes modifying a matte generated using at least one digital image processing technique.

The method further includes generating an accessory background matte for the at least one accessory. In one or more embodiments, generating the accessory background matte includes modifying a matte generated using at least one digital image processing technique.

In one or more embodiments, the method further includes rotating the mount around an axis from a first orientation to a second orientation. The first orientation and the second orientation are selected from the at least one orientation.

In one or more embodiments, the method further includes coupling a related accessory with a mount, positioning the mount in at least one second accessory orientation, capturing at least one related accessory image of the related accessory coupled with the mount in the at least one related accessory orientation, generating at least one related accessory foreground matte for the at least one related accessory, and generating a related accessory background matte for the at least one accessory image. The related accessory is associated with the accessory. The at least one related accessory orientation is determined based on a relationship between the accessory and the related accessory. In one or more embodiments, the first orientation and the second orientation are associated with a left ear accessory image and a right ear accessory image, and the at least one accessory image includes the left ear accessory image and a right ear accessory image.

In one or more embodiments, the accessory is an ear accessory. The mount may include a dampening device configured to reduce a sway movement of a hanging part of the ear accessory.

In one or more embodiments, the method further includes coupling a matching ear accessory with a model mount including a model of an ear, positioning the model mount in the at least one orientation, capturing at least one reference image of the matching ear accessory coupled with the model mount in the at least one orientation. The at least one reference image may be used to modify the at least one accessory foreground matte and the at least one accessory background matte.

In one or more embodiments, the method further includes obtaining a subject image of a subject including at least one ear region of the subject, generating a subject background layer based on the subject image, generating an ear layer based on the subject image, and rendering a simulated image of the subject wearing the accessory by layering the subject background layer, at least one background portion of the at least one ear accessory image, the ear layer, and at least one foreground portion of the at least one ear accessory image using the at least one accessory foreground matte and the at least one accessory background matte.

In one or more embodiments, the method further includes generating a hair layer based on the subject image. Rendering the simulated image further includes layering the hair layer.

In one or more embodiments, the method further includes determining an estimated head orientation, where accessory image selection from the at least one accessory image and matte selection from the at least one accessory foreground matte and the at least one accessory background matte are based on the estimated head orientation.

In one or more embodiments, the method further includes obtaining a subject image of a subject including at least one accessory region of the subject, generating a subject background layer based on the subject image, generating a subject foreground layer based on the subject image, and rendering a simulated image of the subject wearing the accessory by layering the subject background layer, at least one background portion of the at least one ear accessory image, the ear layer, and at least one foreground portion of the at least one ear accessory image using the at least one accessory foreground matte and the at least one accessory background matte. The subject background layer is configured to appear behind an accessory background. The subject foreground layer is configured to appear in front of an accessory background and behind an accessory foreground.

In one or more embodiments, the method further includes determining at least one accessory scaling factor based at least one reference marker in the at least one target accessory image and at least one inter-pupillary distance of the subject in the subject image. The method may further include displaying the simulated image in association with marketing material for the accessory. The subject image may be a professionally photographed image of a model.

One or more embodiments of systems and methods for simulating accessory display on a subject are directed to a computer-readable medium including computer-readable instructions for simulating accessory display on a subject.

Execution of the computer-readable instructions by one or more processors causes the one or more processors to carry out steps including obtaining at least one subject image of a subject including at least one ear region of the subject. The at least one subject image may include at least one professionally photographed image of a model. The at least one subject image may include at least one rendered image of a 3-D model of a subject or avatar.

The steps further include obtaining at least one ear accessory image of the ear accessory mounted on a mount.

The steps further include obtaining at least one accessory foreground matte for the at least one ear accessory image. The at least one accessory foreground matte is generated based on the at least one ear accessory image.

The steps further include obtaining at least one accessory background matte for the at least one ear accessory image.

The steps further include generating a subject background layer based on the subject image.

The steps further include generating an ear layer based on the subject image.

The steps further include rendering a simulated image of the subject wearing the accessory by layering the subject background layer, at least one background portion of the at least one ear accessory image, the ear layer, and at least one foreground portion of the at least one ear accessory image using the at least one accessory foreground matte and the at least one accessory background matte.

In one or more embodiments, the steps further include displaying the at least one simulated image in association with marketing material for the ear accessory.

BRIEF DESCRIPTION OF THE DRAWINGS

The above and other aspects, features and advantages of the invention will be more apparent from the following more particular description thereof, presented in conjunction with the following drawings wherein:

FIGS. 5A-5G illustrate exemplary accessory image processing in accordance with systems and methods for simulating accessory display on a subject.

FIGS. 7A-7E illustrate exemplary intermediate rendering products in accordance with systems and methods for simulating accessory display on a subject.

DETAILED DESCRIPTION

Systems and methods for simulating accessory display on the subject will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary kill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
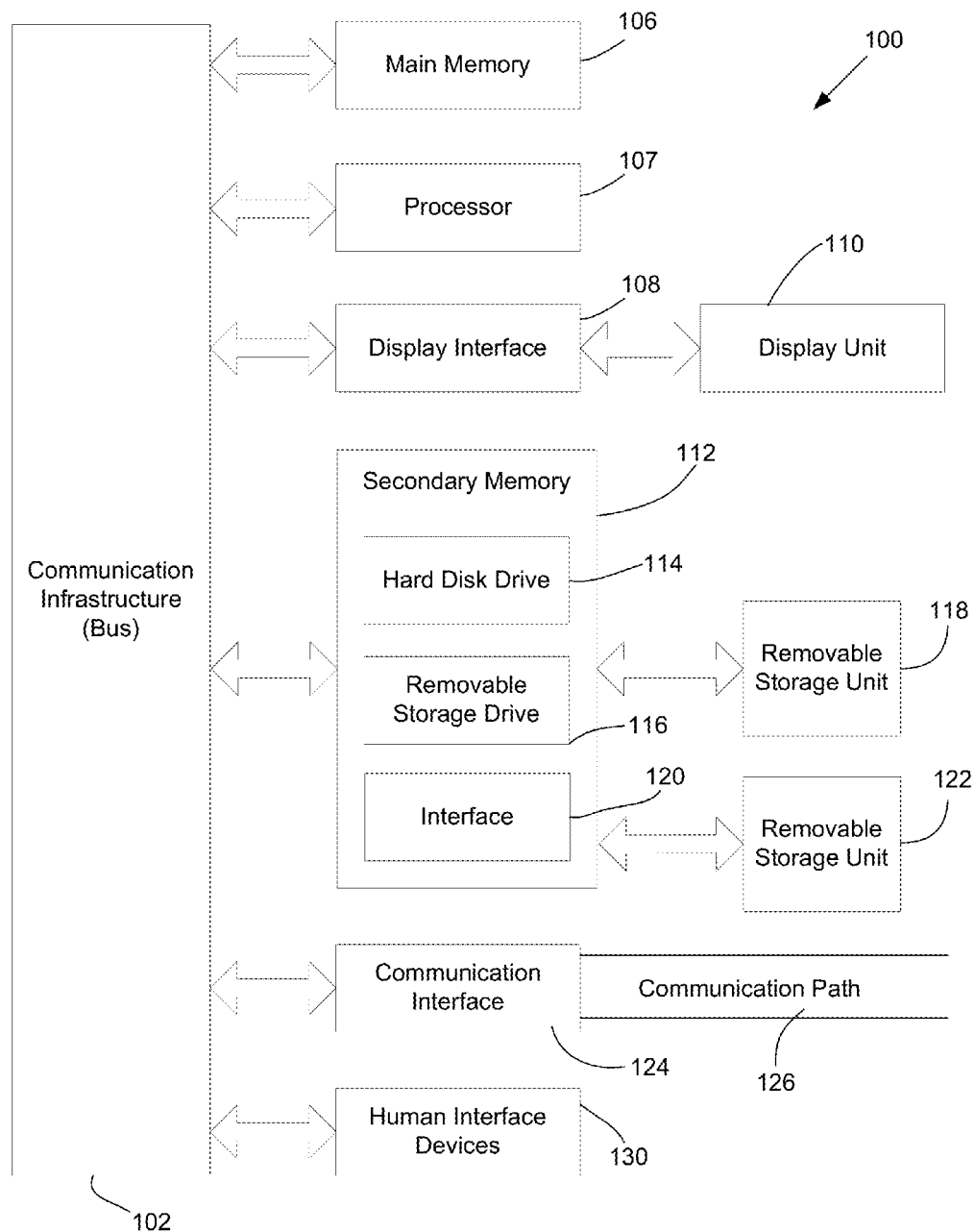
FIG. 1 illustrates a general-purpose computer and peripherals that when programmed as described herein may operate as a specially programmed computer capable of implementing one or more methods, apparatus and/or systems in accordance with systems and methods for simulating accessory display on a subject.

FIG. 1 diagrams a general-purpose computer and peripherals, when programmed as described herein, may operate as a specially programmed computer capable of implementing one or more methods, apparatus and/or systems in accordance with systems and methods for simulating accessory display on a subject. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 1.

Figure 2:
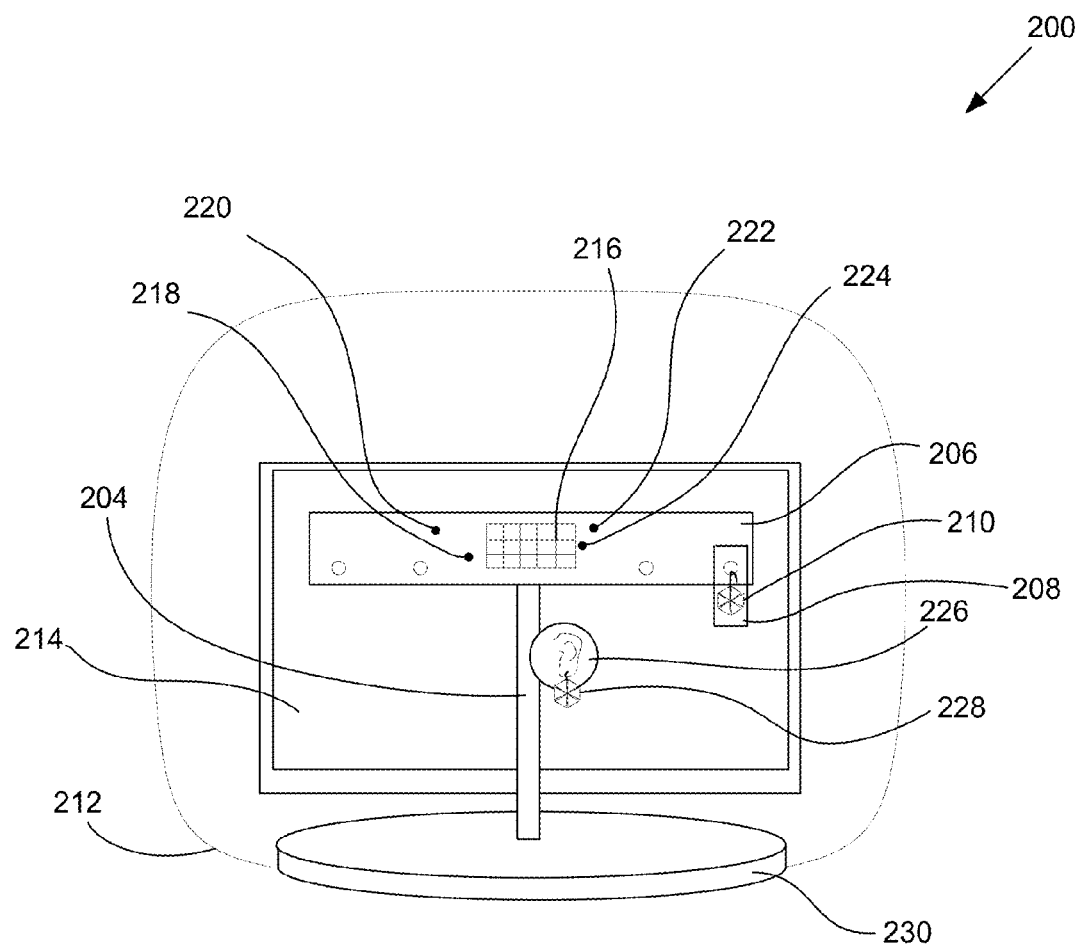
FIG. 2 illustrates an exemplary system for capturing accessory images in accordance with systems and methods for simulating accessory display on a subject.

FIG. 2 illustrates an exemplary system for capturing accessory images in accordance with systems and methods for simulating accessory display on a subject.

Image capture system 200 is configured to acquire images of at least one accessory 210. Accessory 210 may be any accessory that may be worn by a subject or suitable for simulating on a subject. For example, the accessory may be a piercing accessory, a shoulder accessory, an arm accessory, a neck accessory, a foot accessory, a wrist accessory, a finger accessory, or any other accessory suitable for wearing by a subject. In one or more embodiments, accessory 210 is an ear accessory. Accessory 210 may have one or more matching accessories, such as additional accessories in a set. A matching accessory may be identical, have mirror-image symmetry, have any other type of symmetry, or be nonsymmetrical.

Image capture system 200 includes mount 204. Mount 204 has at least one contact portion configured to contact accessory 210. Mount 204 may have transparent portion 206, where transparent portion 206 is configured to contact accessory 210. In one or more embodiments, accessory 210 is a piercing accessory with a piercing portion configured to pass through one or more portions of the subject, the subject's clothing, and/or any other material attached to the subject. When accessory 210 is a piercing accessory, the contact portion of mount 204 is configured to receive the piercing portion of accessory 210, allowing the piercing portion of the accessory to pass through the contact portion of mount 204.

In one or more embodiments, mount 204 further includes dampening device 208. Dampening device 208 is configured to dampen free-hanging motions of accessory 210, including free-hanging motions caused by movement of mount 204, placing accessory 210 on mount 204, or any other free-hanging motion. In one or more embodiments, dampening device 208 has at least one transparent portion. Dampening device 208 may be configured to support any free-hanging portions of accessory 210 that may swing, sway, or otherwise move.

In one or more embodiments, mount 204 is configured to move between multiple orientations. The move may be performed automatically or manually. Mount 204 may be coupled to rotating stage 230 configured to rotate mount 204 between multiple orientations. In one or more embodiments, rotating stage 230 is a computer-controlled platform configured to rotate between a series of four orientations corresponding to left and right front and side views, such as the orientations shown in FIGS. 3A-3D. Alternatively, multiple mounts and rotating elements may be used to simultaneously capture multiple views of one or more accessories 210.

Mount 204 may include at least one reference marker 216-224 of a known color and/or position. Reference markers 216-224 may relate to position, orientation, color, or any other objective characteristic of accessory 402. Reference markers 216-224 may be placed on or near mount 204 such that reference markers 216-224 are captured by an imaging device configured to capture images of accessory 210. For example, reference markers 216-224 may be located in a known position relative to mount 204 to support acquisition of geometric and photometric characteristics of accessory 210. Reference markers 216-224 may be used to determine a distance, orientation, color adjustment between any accessory image and any subject image. For example, an accessory scaling factor may be calculated based on at least one reference marker.

In one or more embodiments, reference markers 216-224 includes four reference markers 218-224 mounted to at least one transparent portion 206 of mount 204. In one or more embodiments, mount 204 is positioned in a known orientation with respect to the imaging device, enabling the mount's position relative to the imaging device to be represented using a homography (projective transformation) or plane-to-plane mapping in 3D. Reference markers 218-224 are easily detected and recognized using one or more image processing techniques, algorithms and/or heuristics. In one or more embodiments, a user may review and/or correct a location of a reference marker in an accessory image.

Reference markers 216-224 may include a color chart 216, such as a mini Macbeth color color chart (X-rite ColorChecker) whose appearance in the color picture gives photometric responses of known color samples and may be used for color correction while virtually simulating an accessory in different subject images.

Image capture system 200 may further include model mount 226. Model mount 226 is configured to resemble one or more body parts associated with the accessory to simulate a subject wearing the accessory. In one or more embodiments, model mount 226 is configured to receive a piercing portion of a model accessory 228 allowing the piercing portion to pass through a contact portion of model mount 226. Model accessory 228 may be an identical matching accessory of accessory 210. Images of model mount 226 and model accessory 228 may be used as a reference image in accordance with one or more embodiments of systems and methods for simulating accessory display on a subject. For example, the reference image may be used to verify scale accuracy, as a visual aid when performing one or more masking procedures disclosed herein, and for any other reference purpose.

In one or more embodiments, model mount 226 is coupled with mount 204, such that any change in orientation of mount 204 results in the same change in orientation for model mount 226. In one or more embodiments, a mirror image model mount of model mount 226 is used to when images of a matching accessory are captured.

Image capture system 200 may further include at least one diffuse light source 212. Diffuse light source 212 may be used to capture an accessory image, such as the accessory image shown in detail in FIG. 4A. Diffuse light source 212 is configured to provide even lighting to minimize reflection and other undesired artifacts. In one or more embodiments, diffuse light source 212 includes one or more standard lighting sources, including soft boxes, spotlights and flash devices, and one or more diffusers configured to diffuse light generated by the standard lighting sources. In one or more embodiments, diffuse light source 212 includes a diffuser partially surrounding mount 204.

Image capture system 200 may further include at least one backlight source 214. Backlight source 214 may be used to capture an accessory matte image, such as the accessory matte image shown in detail in FIG. 4B. In one or more embodiments, backlight source 214 is the only source of light when an accessory matte image is captured. Backlight source 214 may include any source of light located behind mount 204 with respect to an imaging device, including any backlight source use in the field of photography. In one or more embodiments, the backlight source is highly controllable. For example, a monitor positioned behind mount 204 may be used to display backlighting with adjustable intensities and/or patterns.

Figure 3A:
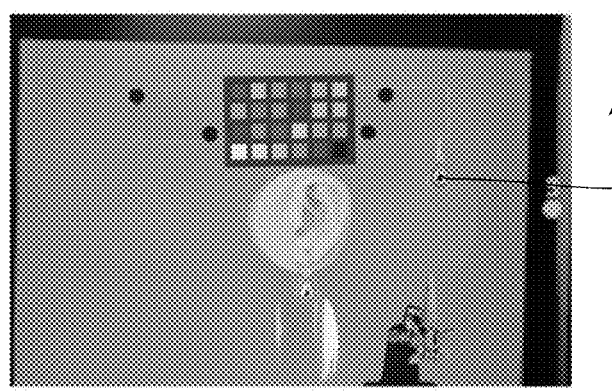
FIGS. 3A-3D illustrate exemplary accessory image capture orientations in accordance with systems and methods for simulating accessory display on a subject.
Figure 3B:
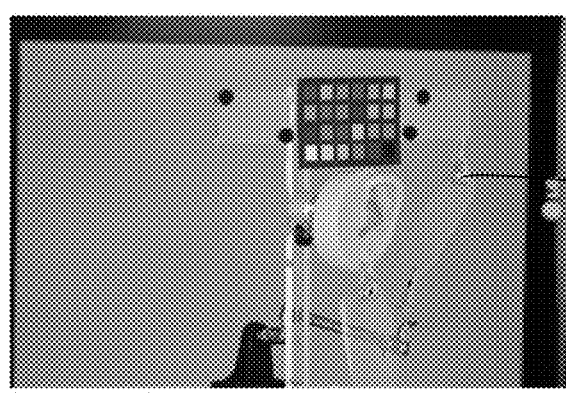
Figure 3C:
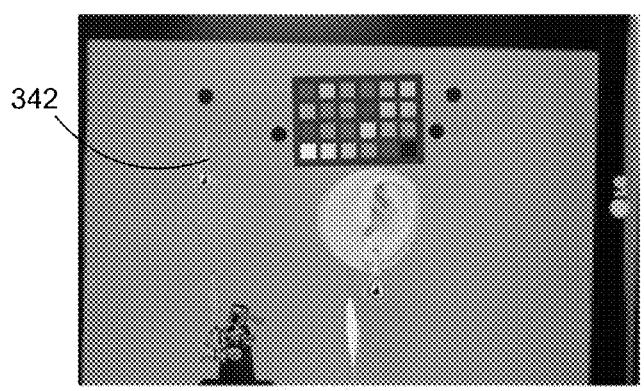
Figure 3D:
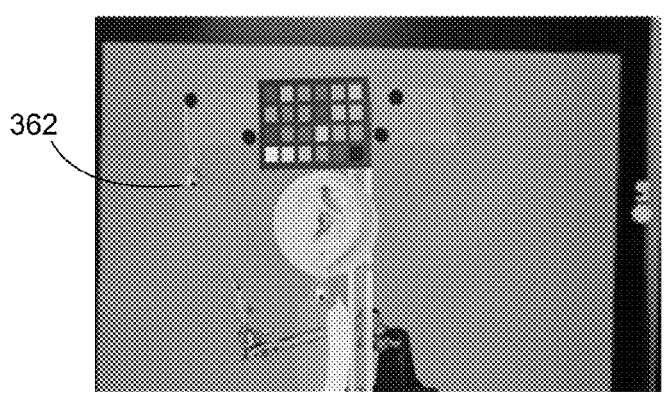

FIGS. 3A-3D illustrate exemplary accessory image capture orientations in accordance with systems and methods for simulating accessory display on a subject. FIG. 3A shows accessory image 300. In accessory image 300, accessory 302 is positioned in an orientation corresponding to a left ear accessory of a matching set on a turned face. FIG. 3B shows accessory image 320. In accessory image 320, accessory 322 is positioned in an orientation corresponding to a left ear accessory of a matching set on a frontal face. FIG. 3C shows accessory image 340. In accessory image 340, accessory 342 is positioned in an orientation corresponding to a right ear accessory of a matching set on a turned face. FIG. 3-D shows accessory image 360. In accessory image 360, accessory 362 is positioned in an orientation corresponding to a right ear accessory of a matching set on a frontal face. To acquire accessory images 300 and 320, a left accessory of a matching set may be used. A right accessory of the matching set may be used to acquire images 340 and 360.

Figure 4A:
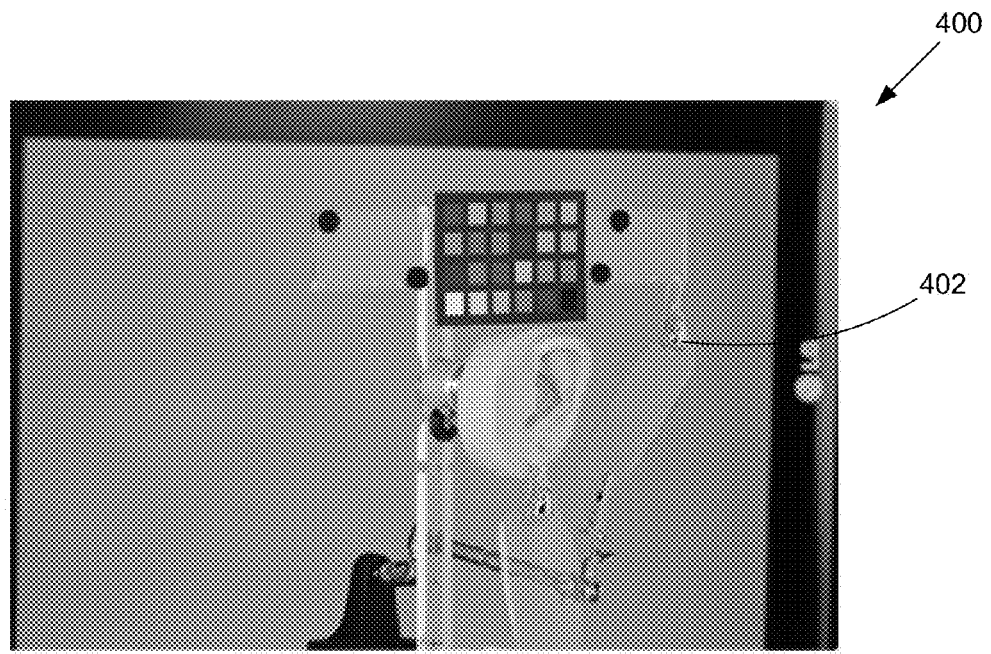
FIGS. 4A-4B illustrate exemplary captured accessory images in accordance with systems and methods for simulating accessory display on a subject.
Figure 4B:
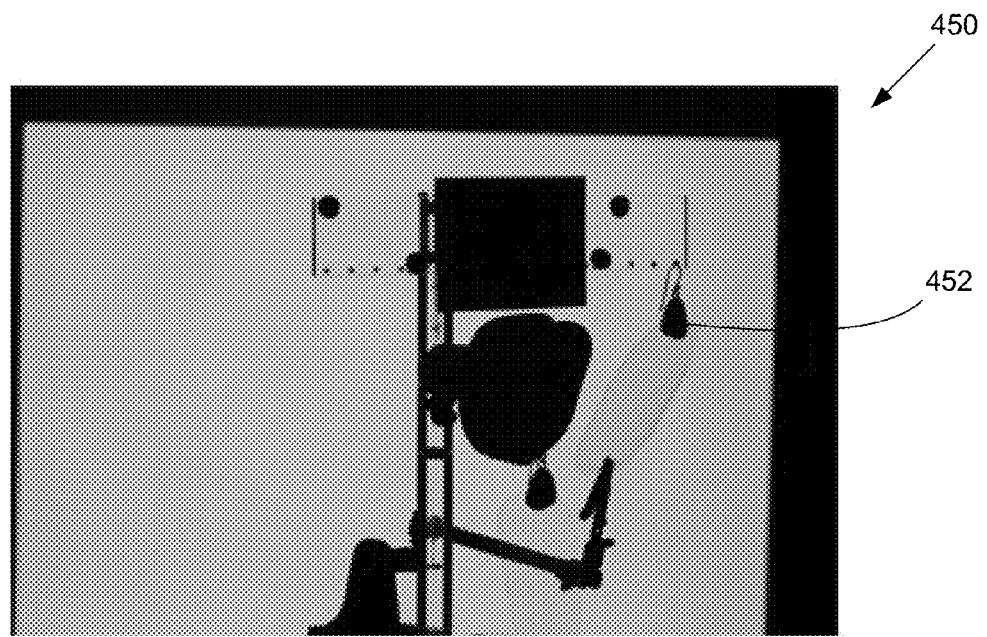

FIGS. 4A-4B illustrate exemplary captured accessory images in accordance with systems and methods for simulating accessory display on a subject. FIG. 4A shows accessory image 400. FIG. 4B shows accessory matte image 450. Accessory image 400 and accessory matte image 450 are acquired using at least one imaging device. In one or more embodiments, the same imaging device is used to capture accessory image 400 and accessory matte image 450. The imaging device may be configured to capture accessory image 400 and accessory matte image 450 in rapid succession. In one example, a Nikon D300 camera is used in continuous burst mode, which enables the capture of 8 pictures per second.

Accessory image 400 and accessory matte image 450 may be taken under different lighting conditions. Accessory image 400 may be taken using standard photographic lights, including soft boxes, spotlights, and strobes. The lighting may be positioned and aimed with modeling lights to stylize the appearance of accessory 402 in the imaging device's view. In one or more embodiments, accessory image 400 is captured with all studio lights on and the backlight off while the accessory matte image 450 is taken with all lights off except backlighting. The accessory image 400 and accessory matte image 450 should be either the same size and aligned, or a transformation must be applied to register the two images.

In one or more embodiments, the backlighting, provided by at least one backlight source, is the only source of light when accessory matte image 450 is captured. A backlight source may include any source of light located behind the accessory with respect to an imaging device, including any backlight source use in the field of photography. In one or more embodiments, the backlight source is highly controllable. For example, a monitor positioned behind the accessory may be used to display backlighting with adjustable intensities and/or patterns.

Accessory matte image 450 is used to generate an accessory foreground matte and an accessory background matte, both shown in FIGS. 5A-5G. In one or more embodiments, backlighting with adjustable intensities and/or patterns is used to iteratively refine an accessory foreground matte and/or an accessory background matte. Iterative matte refining is used to eliminate false transparency artifacts caused by reflections of the backlight off the accessory and into the imaging device. This is particularly useful when the accessory has a reflective surface. False transparency artifacts are more likely to occur when the backlight covers a wide area behind the accessory. Light rays which reflect off curved edges of an accessory are more likely to be captured by imaging device as the light source moves away from the accessory's edge in the image plane. An initial alpha matte with possible false transparency artifacts may be automatically improved by thresholding the alpha matte to make it binary, hole-filling and dilating with morphological operators, displaying a reduced lighting pattern on the backlight in place of the initial backlight pattern, and reshooting accessory matte image 450. Full accessory image 400 may also be recaptured, such as use by using the rapid capture techniques described herein.

In one or more embodiments where iterative matte calculation is used, the accessory is backlit with a refined alpha matte image is to align the pattern directly behind the accessory from the perspective of the imaging device. This may be achieved by computing a camera-to-display homography using four point correspondences between the monitor and the imaging device. Following homography estimation, the post-processed alpha matte is warped under the camera-to-display homography and displayed on the monitor.

In one or more embodiments, a binary black/white pattern on a monitor is used to provide backlighting directly behind accessory 452. To avoid reflections off the occluding contours of accessory 452, a pattern that is tightly bound to accessory 452 minimizes the potential artifacts from such reflection. Any other backlighting pattern may be used, such as a uniform lighting, radial lighting, and a pattern based on the shape of the mount, a pattern based on the actual size and/or shape of accessory 452, and any other pattern or combination thereof. The backlight pattern may be modified for different accessories, different orientations of the same accessory, subsequent iterations to refine a matte, and for any other purpose. In one or more embodiments, a computing device communicatively coupled with the imaging device and at least one backlight source may be used to control backlight intensity, pattern, and timing.

Where the only light source is the monitor, the intensity of light in accessory matte image 450 is approximately proportional to visibility of accessory 452, providing information on the opacity of accessory 452. The light intensity in original matte image 452 is also affected by the backlight source intensity and pattern as well as refraction away from the camera's viewpoint caused by any surface in an image capture system, such as the image capture system shown in FIG. 2.

FIGS. 5A-5G illustrate exemplary accessory image processing in accordance with systems and methods for simulating accessory display on a subject. The masking procedures shown in FIGS. 5A-5G may be performed manually or automatically detected using one or more image processing techniques, algorithms and/or heuristics. In one or more embodiments, manual labor for accessory image acquisition is limited to accessory placement on the mount, verification of at least one reference marker, and manual masking identifying a foreground and the background portion in four accessory images in the orientations shown in FIGS. 4A-4D. A pair of matching, mirror-image, or non-matching ear accessories typically takes less than 4 minutes to process. In one or more embodiments, at least one product shown in FIGS. 5A-5G is a binary mask.

FIG. 5A shows a portion of exemplary accessory image 500. Accessory image 500 includes at least a portion of accessory image 400 captured by an imaging device. In one or more embodiments, the accessory is a piercing accessory with a piercing portion configured to pass through one or more portions of the subject. Accessory piercing point 518 is the point on the piercing accessory that will go through a piercing location on the subject.

FIG. 5B shows exemplary coarse accessory mask 510. Coarse accessory mask 510 identifies an area that includes all of foreground portion 512 of the accessory that typically appears in front of a subject foreground layer. The identified area also includes background portion 514 of the accessory that typically appears behind a subject foreground layer, excluding rear contact portion 516, located directly behind the contact portion of the mount holding the accessory. In one or more embodiments, coarse foreground mask 510 is manually obtained. For example, coarse foreground mask 510 may be input as a series of control points. In one or more embodiments, coarse foreground mask 510 is a selected from a collection of predefined coarse foreground masks or it is automatically constructed from the accessory image and the accessory matte image.

FIG. 5C shows an exemplary coarse background mask 520. Coarse background mask 520 identifies an area that includes most of background portion 514 of the accessory. The identified area excludes all of a foreground portion of an accessory typically appearing in front of a subject foreground layer. Coarse background mask 520 may include at least a part of rear contact portion 516. In one or more embodiments, coarse foreground mask 520 is manually obtained. For example, coarse foreground mask 520 may be input as a series of control points. In one or more embodiments, coarse background mask 510 is a selected from a collection of predefined coarse background masks or it is automatically constructed from the accessory image and the accessory matte image.

FIG. 5D shows an exemplary accessory matte image 530. Accessory matte image 530 includes at least a portion of accessory matte image 450 captured by an imaging device. Accessory matte image 530 is used to generate accessory matte 540. Accessory matte image 530 may be iteratively refined, as discussed with respect to FIG. 4B.

FIG. 5E shows an exemplary accessory matte 540. To generate accessory matte 540, one or more image processing techniques, algorithms and/or heuristics are performed on accessory matte image 530. For example, one or more of homography estimation, thresholding, color inversion and any other image processing techniques suitable for generating a matte from accessory matte image 530 captured by the imaging device may be used. In one or more embodiments, a histogram of intensities is computed on the output of a pixel-wise multiplication of accessory matte image 530. One or more embodiments, a Gaussian smoothing operation is applied to the histogram, and the mean bin value is applied as a threshold to segment the histogram into bright and dark modes. A transfer function may be constructed over the domain starting at step down edge at bin i to step up edge at bin j. In one or more embodiments, the transfer function is a nonlinear transfer function mapping $y=\max(0, \min(1, ((x-i)/(j-i))^2))$. Normalized accessory foreground matte 540 is given by the masked matte under the transfer function $y=\max(0, \min(1, ((x-i)/(j-i))^2))$.

FIG. 5F shows an exemplary accessory background matte 550. Accessory background matte 550 identifies a background portion of the accessory that typically appears behind a subject foreground layer. In one or more embodiments, accessory background matte 550 is generated by multiplying accessory matte 540 and coarse background mask 520.

FIG. 5G shows an exemplary accessory foreground matte 560. Accessory foreground matte 560 identifies a foreground portion of the accessory that typically appears in front of a subject foreground layer. In one or more embodiments, accessory foreground matte 560 is generated either by multiplying accessory matte 540 and coarse foreground mask 510 and subtracting accessory background matte 550 or by subtracting coarse background mask 520 from coarse foreground mask 510 and multiplying the difference with accessory matte 540.

Figure 6A:
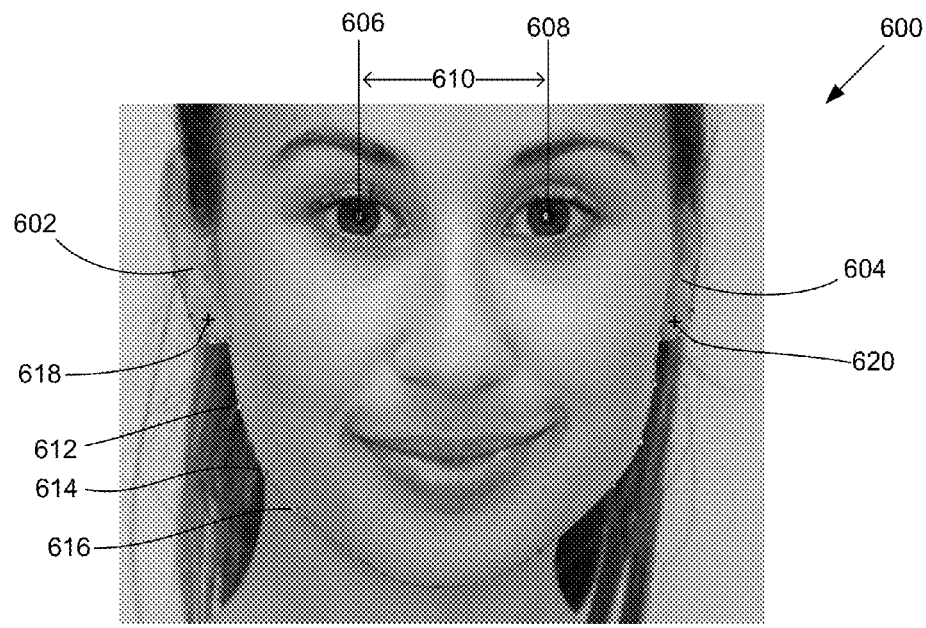
FIGS. 6A-6C illustrate exemplary subject image processing in accordance with systems and methods for simulating accessory display on a subject.
Figure 6B:
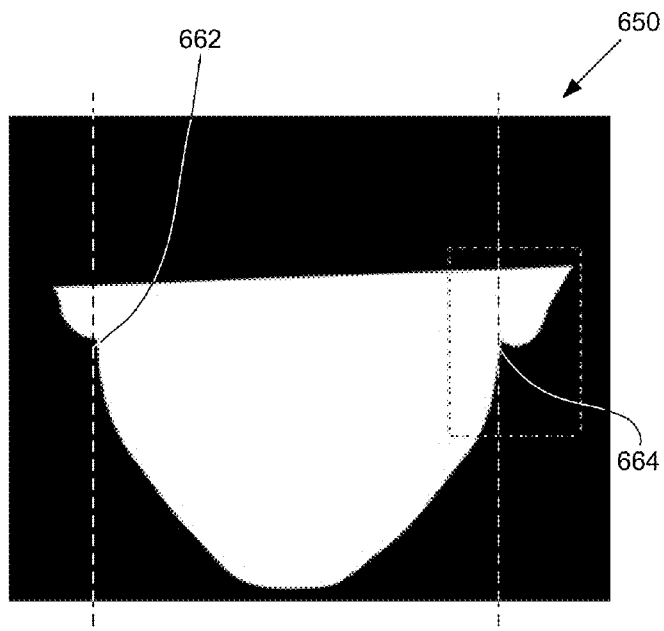
Figure 6C:
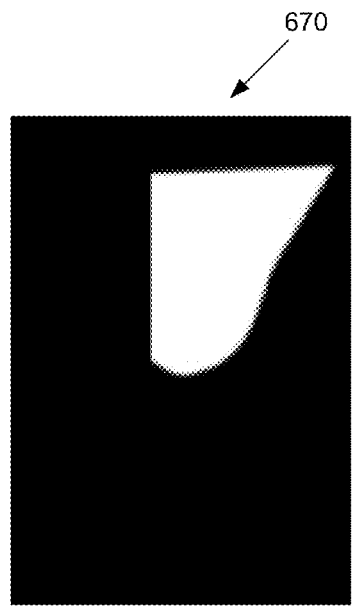

FIGS. 6A-6C illustrate exemplary subject image processing in accordance with systems and methods for simulating accessory display on a subject.

FIG. 6A shows exemplary subject image 600. Subject image 600 includes at least one accessory zone 602-604. At least one simulated accessory will be rendered in accessory zones 602-604. The accessory may include any accessory that may be worn by a subject or suitable for simulating on a subject. For example, the accessory may be a piercing accessory, a shoulder accessory, an ear accessory, an arm accessory, a neck accessory, a foot accessory, a wrist accessory, a finger accessory, or any other accessory suitable for wearing by a subject. In one or more embodiments, accessory zone 602-604 includes at least one ear of the subject. The accessory may have one or more matching accessories, such as additional accessories in a set. A matching accessory may be identical, have mirror-image symmetry, have any other type of symmetry, or be nonsymmetrical.

Subject image 600 may include the subject's pupils 606-608. An inter-pupillary distance (IPD) 610 may be calculated by the distance between pupils 606-608. Inter-pupillary distance 610 may be calculated by using computational methods to detect pupils 606-608 in subject image 600. The inter-pupillary distance is roughly constant among women (mean IPD is 62.31 mm with a standard deviation of 3.599 mm) and thus serves as a reference measurement for scaling for frontal images of arbitrary subjects. Inter-pupillary distance 610 may be used as a scale estimate to determine the proper scaling of an accessory simulated on subject image 600. Therefore, at least one accessory scaling factor may be based on inter-pupillary distance 610. In one or more embodiments, a head orientation may be estimated based on inter-pupillary distance 610. The estimation may be performed by comparing inter-pupillary distance 610 with one or more other features of the subject photograph using one or more image processing techniques, algorithms and/or heuristics. The estimated head orientation may be selected from a frontal orientation and a turned orientation. In one or more embodiments, accessory images are selected based on the estimated head orientation. The accessory images may be selected from frontal orientation images and turned orientation images.

In one or more embodiments, the accessory to be simulated is a piercing accessory. Piercing locations 618-620 may be determined in subject image 600. A user uploading subject image 600 may be asked to input, modify or confirm piercing locations 618-620. In one or more embodiments, subject image 600 is a photograph of a model used to display a plurality of accessories simulated on the model, and piercing locations 618-620 are manually input, modified and/or confirmed.

A plurality of control points 612-616 may be obtained with respect to subject image 600. Control points 612-616 identify a region of the subject that includes a subject foreground area that typically appears in front of an accessory background and behind an accessory foreground. In one or more embodiments, control points 612-616 identify a region that includes at least one ear of the subject. Control points 612-616 may be obtained manually or automatically detected using one or more image processing techniques, algorithms and/or heuristics.

A user uploading subject image 600 may be asked to input, modify or confirm control points 612-616. In one or more embodiments, subject image 600 is a photograph of a model used to display a plurality of accessories simulated on the model, and control points 612-616 are manually input, modified and/or confirmed.

FIG. 6B shows exemplary initial subject mask 650. Initial subject mask 650 may be determined based on control points 612-616. In one or more embodiments, a spline fit through control points 612-616 defines the boundary of initial subject mask 650. Initial subject mask 650 may be further processed to generate subject foreground mask 670.

In one or more embodiments, subject foreground mask 670 includes at least one of a subject's ears and control points 612-616 define a portion of a subject's face that includes piercing locations 618-620. Initial subject mask 650 may be segmented to determine a subject foreground layer that includes at least one ear. In one or more embodiments, initial subject mask 650 is vertically divided at ear-face junction points 662-664. One or more embodiments where a face orientation is not upright, initial subject mask 650 may be divided with respect to a different angle. Ear-face junction points 662-664 may be obtained manually or automatically detected using one or more image processing techniques, algorithms and/or heuristics. FIG. 6C shows a portion of exemplary subject foreground mask 670 after initial subject mask segmentation.

FIGS. 7A-7E illustrate exemplary intermediate rendering products in accordance with systems and methods for simulating accessory display on a subject.

FIG. 7A shows a portion of exemplary subject image 700 containing a region on which an accessory will be simulated. FIG. 7B shows exemplary accessory image 710 of the accessory to be simulated on the subject. In one or more embodiments, the background subject layer is rendered below the accessory background layer, which is rendered below the subject foreground layer, which is rendered below the accessory foreground layer.

FIG. 7C shows exemplary layered alpha matte output 720. Layered alpha matte output 720 is a final matte that accounts for the layering of each layer identified by the subject background layer, the accessory background matte, the subject foreground layer, and the accessory foreground matte. Layered alpha matte output 720 includes a foreground region 722 and a background region 724. In one or more embodiments, layered alpha matte output 720 is calculated by adding a foreground region 722 and a background region 724. The foreground region 722 may be determined by an accessory foreground matte (e.g. accessory foreground matte 560). The background region 724 may be determined by multiplying or otherwise processing an accessory background matte (e.g. accessory background matte 550) with a subject foreground matte (e.g. subject foreground matte 680), then subtracting the result from the accessory background matte.

One of ordinary skill in the art will recognized that, the subject image, the accessory image, the subject background layer, the subject foreground layer, the accessory background matte and the accessory foreground matte may be used to achieve the desired layering by multiplying, applying, or otherwise manipulating the mattes and images in a different order without departing from the spirit or the scope of the invention.

FIG. 7D shows exemplary rendered image 730 simulating the display of the accessory on the subject. Layered alpha matte output 720 is used to determine portions of accessory image 710 to render on top of subject image 700 in order to render a simulated image where the background subject layer is below the accessory background layer, which is below the subject foreground layer, which is below the accessory foreground layer. Rendering may be accomplished by compositing using a technique such as alpha blending or other compositing techniques.

FIG. 7E shows exemplary enhanced rendered image 740 with additional layers. Additional layers may be used to enhance the accuracy of the simulation. For example, enhanced rendered image 740 includes a shadow layer. In one or more embodiments, a shadow layer is generated based on an accessory matte image and/or an accessory image.

Enhanced rendered image 740 may also include additional layers rendered in front of or behind existing layers. In one or more embodiments, a hair layer is rendered in front of the accessory foreground layer to simulate the subject's hair falling in front of the accessory foreground. A hair layer matte may be generated using any method suitable for generating a hair matte, such as the methods described in U.S. patent application Ser. No. 12/889,533, entitled SYSTEM AND METHOD FOR CHANGING HAIR COLOR IN DIGITAL IMAGES, filed on Sep. 24, 2010, which is herein incorporated by reference in its entirety.

In one or more embodiments, the accessory image, accessory matte image and all mattes and images derived from these images (such as images 500, 510, 520, 530, 540, 550, and 560) may be scaled using the scaling factor computed from inter-pupilary distance 610 and translated to align one of piercing locations 618-620 with the accessory piercing point 518. The accessory images and mattes may be rotated about the accessory piercing point to place the simulated accessory in the desired location, orientation and scale relative to the subject.

Figure 8:
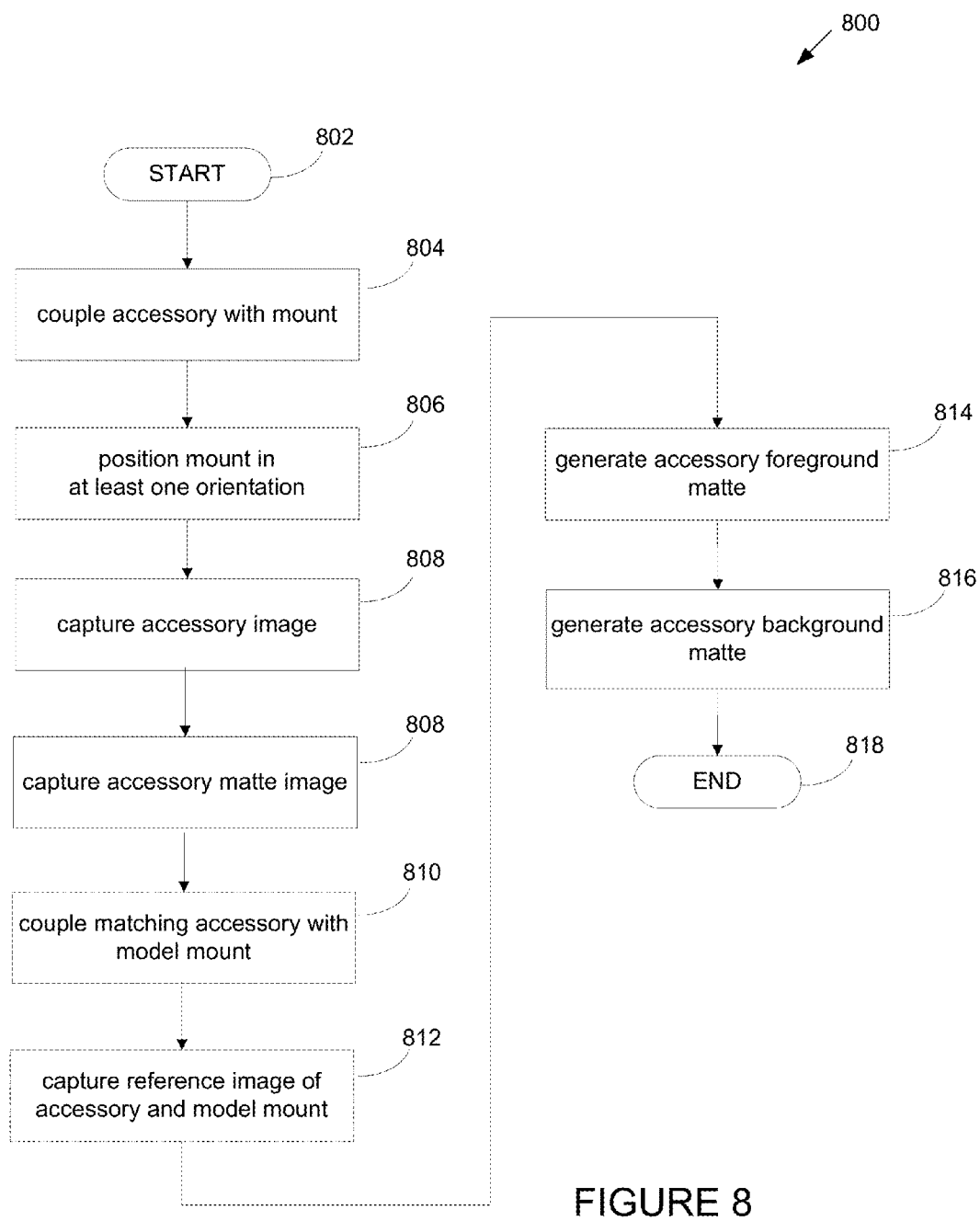
FIG. 8 shows a flowchart for an exemplary method for capturing accessory images in accordance with systems and methods for simulating accessory display on a subject.

FIG. 8 shows a flowchart for an exemplary method for capturing accessory images in accordance with systems and methods for simulating accessory display on a subject. Process 800 begins at step 802.

Processing continues to step 804, where an accessory is coupled with a mount. The mount includes at least one contact portion configured to contact the accessory.

Processing continues to step 806, where the mount is positioned in at least one orientation with respect to an imaging device. In one or more embodiments, the mount is rotatable between two or more orientations. Alternatively, multiple accessories in multiple orientations may be captured simultaneously. Alternatively, multiple fixed mounts at different orientations may be used.

Processing continues to step 808, where at least one accessory image of the accessory coupled with the mount in the at least one orientation is captured using the imaging device. The accessory image may be captured using at least one diffuse light source to illuminate the accessory.

Processing continues to step 810, where at least one accessory matte image of the accessory coupled with the mount in the at least one orientation is captured using the imaging device. The accessory matte image may be captured using at least one backlight source. In one or more embodiments, the backlight source is the only source of light used to capture the accessory matte image.

Processing continues to optional step 810, where a matching accessory is coupled with a model mount. The matching accessory is identical to the accessory. In one or more embodiments, the model mount is configured to resemble one or more body parts associated with the accessory to simulate a subject wearing the accessory.

Processing continues to optional step 812, where at least one reference image of the matching accessory coupled with the model mount is captured. In one or more embodiments, the imaging device is configured to capture the accessory image and the reference image simultaneously in a single larger image.

Processing continues to step 814, where at least one accessory foreground matte is generated for the at least one accessory. The at least one accessory foreground matte may be generated based on the accessory matte image using one or more manual and/or automated steps, including one or more image processing techniques, algorithms and/or heuristics. The accessory image may be evaluated manually and/or by using one or more image processing techniques, algorithms and/or heuristics in the generation of the at least one accessory foreground matte.

Processing continues to step 816, where at least one accessory background matte is generated for the at least one accessory. The at least one accessory background matte may be generated based on the accessory matte image using one or more manual and/or automated steps, including one or more image processing techniques, algorithms and/or heuristics. The accessory image may be evaluated manually and/or by using one or more image processing techniques, algorithms and/or heuristics in the generation of the at least one accessory background matte.

Processing continues to step 818, where process 800 terminates.

Figure 9:
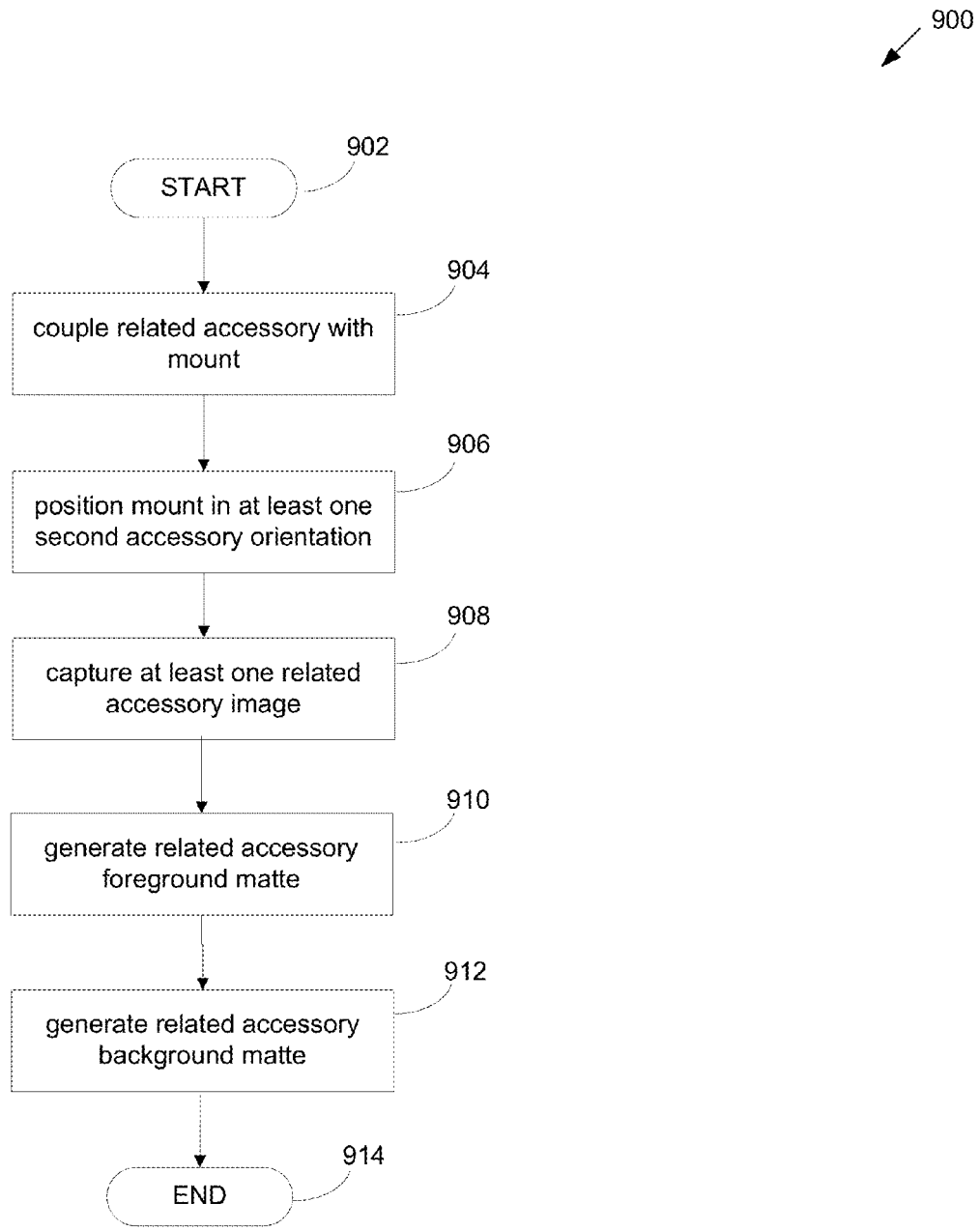
FIG. 9 shows a flowchart for an exemplary method for capturing related accessory images in accordance with systems and methods for simulating accessory display on a subject.

FIG. 9 shows a flowchart for an exemplary method for capturing related accessory images in accordance with systems and methods for simulating accessory display on a subject. Process 900 begins at step 902.

Processing continues to step 904, where a related accessory is coupled with the mount. The related accessory is associated with a first accessory. For example, the related accessory may be a coordinated accessory, a matching accessory from a set of accessories including the first accessory, or any other accessory with a relationship to the first accessory. The accessory may be identical, mirror image symmetric, or non-identical with the first accessory. In one or more embodiments, the related accessory is a matching accessory designed to be worn on the subject in a bilaterally symmetric manner with respect to the first accessory.

Processing continues to step 906, where the mount is positioned in at least one second accessory orientation. In one or more embodiments, the at least one second accessory orientation include reflections of the at least one first accessory orientation across a line of bilateral symmetry.

Processing continues to step 908, where at least one related accessory image of the related accessory coupled with the mount in the at least one related accessory orientation is captured. In one or more embodiments, at least one related accessory matte image is also captured.

Processing continues to step 910, where at least one related accessory foreground matte is generated. The at least one related accessory foreground matte may be generated based on the related accessory matte image using one or more manual and/or automated steps, including one or more image processing techniques, algorithms and/or heuristics. The related accessory image may be evaluated manually and/or by using one or more image processing techniques, algorithms and/or heuristics in the generation of the at least one related accessory foreground matte.

Processing continues to step 912, where at least one related accessory background matte is generated. The at least one related accessory background matte may be generated based on the related accessory matte image using one or more manual and/or automated steps, including one or more image processing techniques, algorithms and/or heuristics. The related accessory image may be evaluated manually and/or by using one or more image processing techniques, algorithms and/or heuristics in the generation of the at least one related accessory background matte.

Processing continues to step 914, where process 900 terminates.

Figure 10:
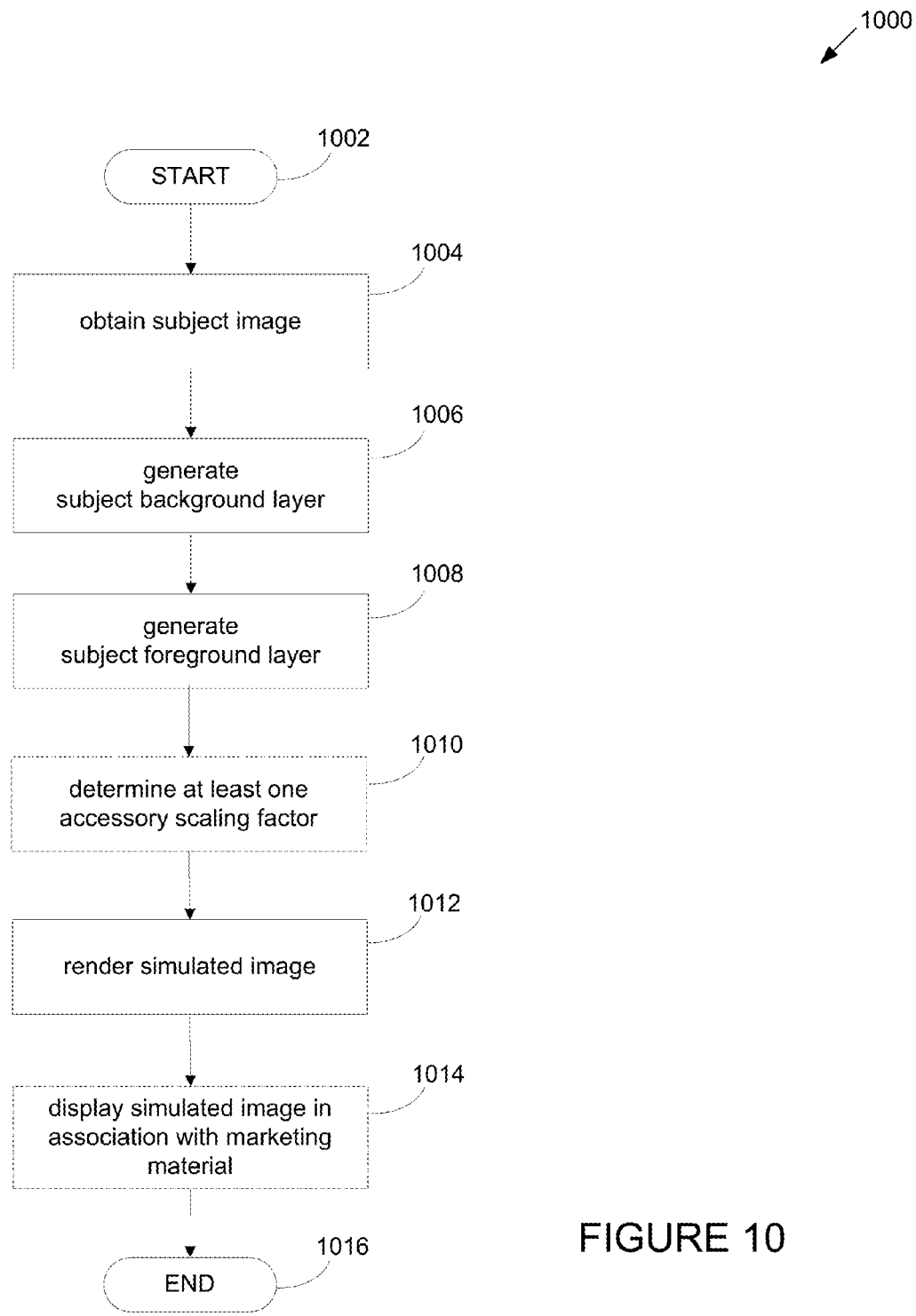
FIG. 10 shows a flowchart for an exemplary method for simulating accessory display on a subject in accordance with systems and methods for simulating accessory display on a subject.

FIG. 10 shows a flowchart for an exemplary method for simulating accessory display on a subject in accordance with systems and methods for simulating accessory display on a subject. Process 1000 begins at step 1002.

Processing continues to step 1004, where a subject image of a subject is obtained. The subject image includes at least one accessory region of the subject corresponding to at least one accessory to be simulated on the subject.

Processing continues to step 1006, where a subject background layer is generated. The subject foreground layer may be generated based on the subject image using one or more manual and/or automated steps, including one or more image processing techniques, algorithms and/or heuristics.

Processing continues to step 1008, where a subject foreground layer is generated. The subject background layer may be generated based on the subject image using one or more manual and/or automated steps, including one or more image processing techniques, algorithms and/or heuristics.

Processing continues to optional step 1010, where at least one accessory scaling factor is determined. The accessory scaling factor reflects the relative size of the accessory to the size of the subject in the digital image. In one or more embodiments, the accessory image includes at least one reference marker from which the accessory scaling factor may be calculated. In one or more embodiments, the accessory scaling factor is determined based on an inter-pupillary distance of the subject image. The scaling factor may also be determined using information from outside the image. For example, where the digital image is obtained from a station set up for the purpose, a sensor may be used for determining the scaling rather than using the data present in the digital image. Where more than one digital image of the subject is processed, the accessory scaling factor may change between digital images. In one or more embodiments, an estimated head position is taken into account when determining the accessory scaling factor.

Processing continues to step 1012, where a simulated image of the subject wearing the accessory is rendered. The simulated image is rendered by registering the subject background layer, at least one background portion of the accessory image, the subject foreground layer, and at least one foreground portion of the accessory image. The at least one accessory background matte is used to determine the at least one background portion of the accessory image. The at least one accessory foreground matte is used to determine the at least one foreground portion of the accessory image.

In one or more embodiments, the accessory is a piercing accessory and the layers are scaled and translated to align at a piercing location such as piercing locations 618-620 with an accessory piercing point. The accessory images and mattes may be rotated about the accessory piercing point to place the simulated accessory in the desired location, orientation and scale relative to the subject.

Processing continues to optional step 1014, where the simulated image of the subject wearing the accessory is displayed in association with marketing material for the accessory.

Processing continues to step 1016, where process 1000 terminates.

Figure 11:
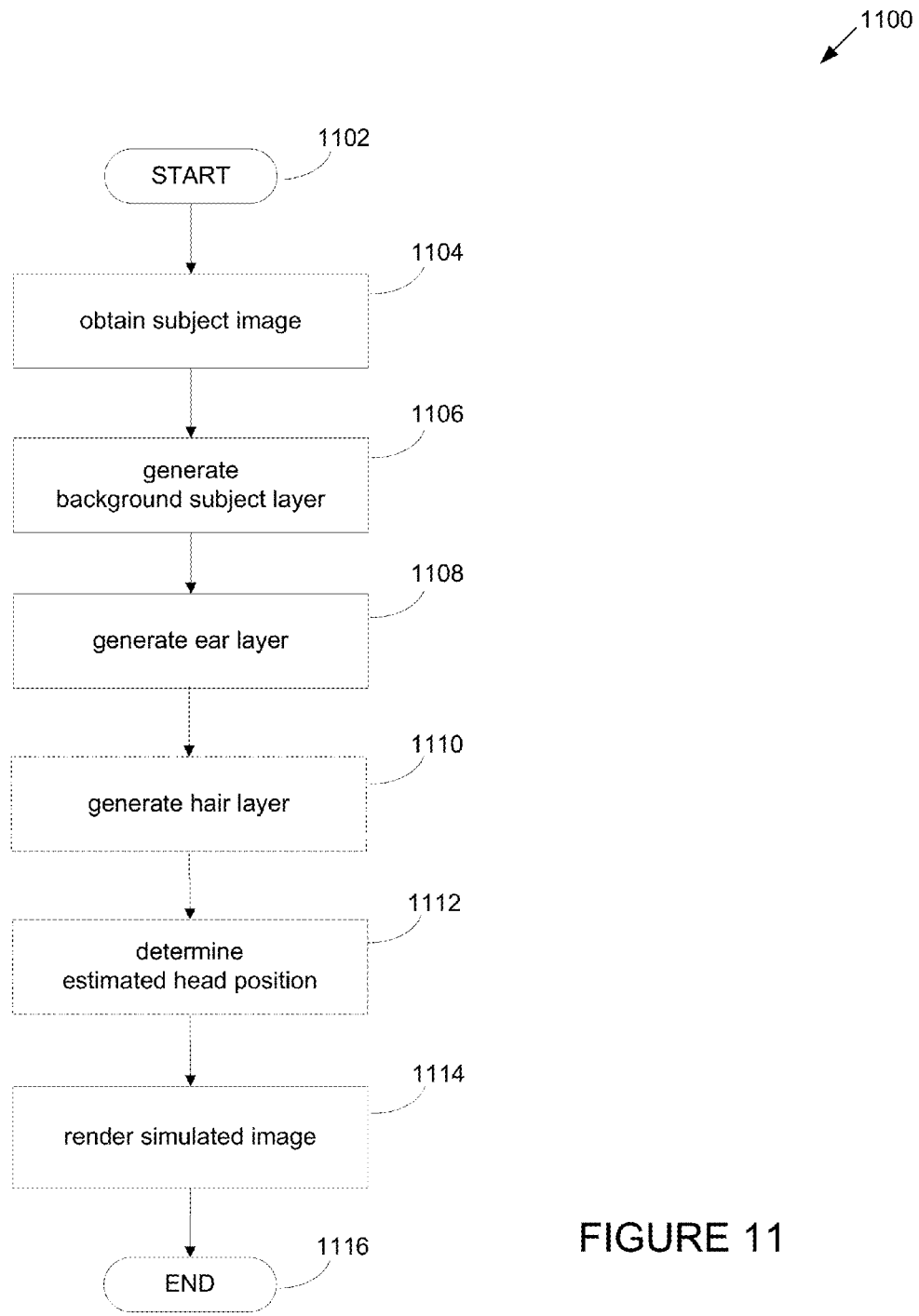
FIG. 11 shows a flowchart for an exemplary method for simulating accessory display on a subject in accordance with systems and methods for simulating accessory display on a subject.

FIG. 11 shows a flowchart for an exemplary method for simulating accessory display on a subject in accordance with systems and methods for simulating accessory display on a subject. Process 1100 begins at step 1102.

Processing continues to step 1104, where a subject image of a subject is obtained. The subject image includes at least one ear of the subject.

Processing continues to step 1106, where a subject background layer is generated. The subject background layer may be generated based on the subject image using one or more manual and/or automated steps, including one or more image processing techniques, algorithms and/or heuristics.

Processing continues to step 1108, where a subject ear layer is generated. The subject ear layer may be generated based on the subject image using one or more manual and/or automated steps, including one or more image processing techniques, algorithms and/or heuristics. The subject ear layer may include at least a portion of one or both ears.

Processing continues to optional step 1110, where a subject hair layer is generated. The subject hair layer may be generated based on the subject image using one or more manual and/or automated steps, including one or more image processing techniques, algorithms and/or heuristics.

Processing continues to optional step 1112, where an estimated head orientation of the subject is determined. The estimated head orientation may be determined based on an inter-pupillary distance of the subject in the subject image.

Processing continues to step 1114, where a simulated image of the subject wearing an ear accessory is rendered. The simulated image is rendered by registering the subject background layer, at least one background portion of an accessory image, the ear layer, and at least one foreground portion of an accessory image, and optionally the hair layer. The accessory image may be selected based on the estimated head position. In one or more embodiments, the layers are scaled and translated to align at a piercing location in the subject image with an accessory piercing point. The accessory images and mattes may be rotated about the accessory piercing point to place the simulated accessory in the desired location, orientation and scale relative to the subject.

In one or more embodiments, one accessory image is selected for each ear. Alternatively, a single accessory image may be used for both ears. When a single accessory image is used, a mirror image of the accessory image may be used to simulate a matching accessory for an opposite ear. An accessory background matte is used to determine the at least one background portion of the accessory image. An accessory foreground matte is used to determine the at least one foreground portion of the accessory image. In one or more embodiments, two matching ear accessories are simulated.

Processing continues to step 1116, where process 1100 terminates.

Figure 12:
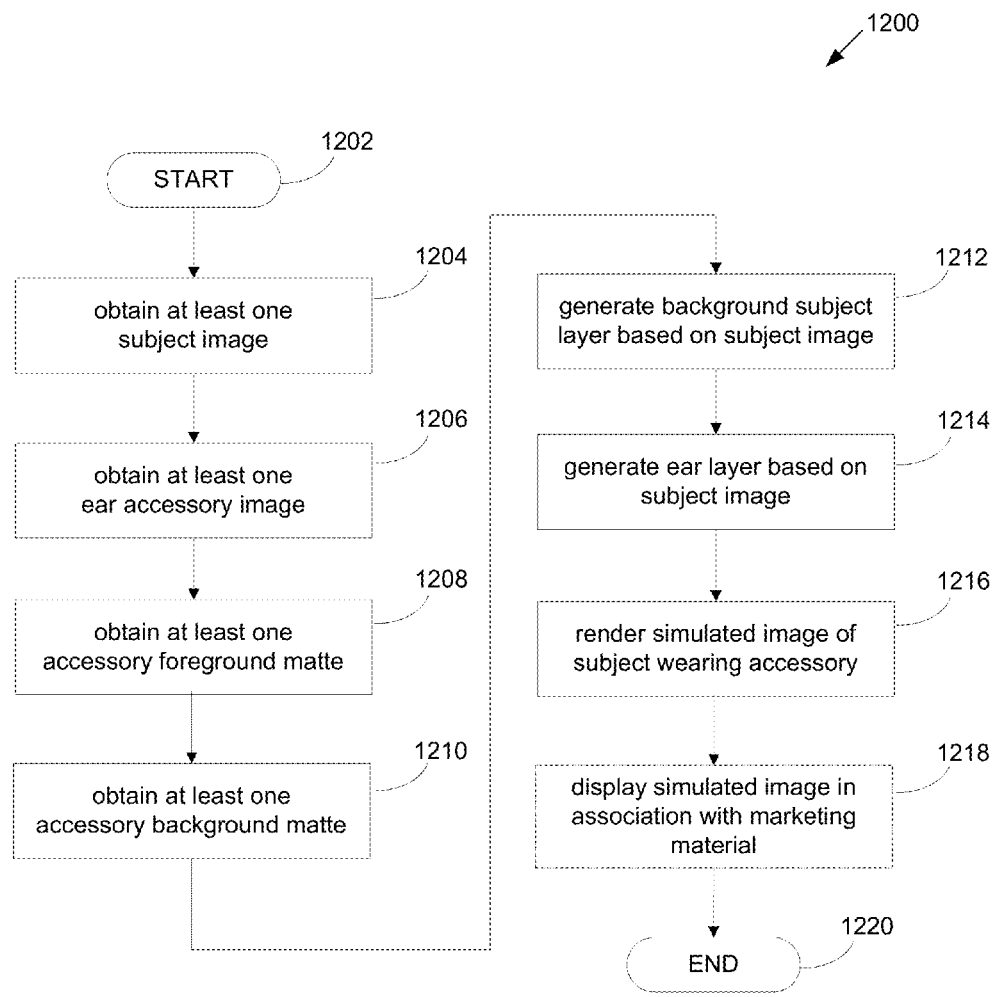
FIG. 12 shows a flowchart for an exemplary method for capturing accessory images in accordance with systems and methods for simulating accessory display on a subject.

FIG. 12 shows a flowchart for an exemplary method for capturing accessory images in accordance with systems and methods for simulating accessory display on a subject. Process 1200 begins at step 1202.

Processing continues to step 1204, where a subject image of a subject is obtained. The subject image includes at least one ear of the subject. In one or more embodiments, the subject image is a professionally photographed image of a model.

Processing continues to step 1206, where at least one ear accessory image is obtained. In one or more embodiments, one accessory image is selected for each ear. Alternatively, a single accessory image may be used for both ears. When a single accessory image is used, a mirror image of the accessory image may be used to simulate a matching accessory for an opposite ear.

Processing continues to step 1208, where at least one accessory foreground matte is obtained. The at least one accessory foreground matte corresponds to the at least one ear accessory image.

Processing continues to step 1210, where at least one accessory background matte is obtained. The at least one accessory background matte corresponds to the at least one ear accessory image.

Processing continues to step 1212, where a subject background layer is generated. The subject background layer may be generated based on the subject image using one or more manual and/or automated steps, including one or more image processing techniques, algorithms and/or heuristics.

Processing continues to step 1214, where a subject ear layer is generated. The subject ear layer may be generated based on the subject image using one or more manual and/or automated steps, including one or more image processing techniques, algorithms and/or heuristics. The subject ear layer may include at least a portion of one or both ears.

Processing continues to step 1216, where a simulated image of the subject wearing at least one accessory is rendered. The simulated image is rendered by registering the subject background layer, at least one background portion of an accessory image, the ear layer, and at least one foreground portion of an accessory image. The accessory background matte is used to determine the at least one background portion of the accessory image. The accessory foreground matte is used to determine the at least one foreground portion of the accessory image.

Processing continues to optional step 1218, where the simulated image of the subject wearing the accessory is displayed in association with marketing material for the accessory. In one or more embodiments, the accessory image, accessory matte image and all mattes and images derived therefrom may be scaled and translated to align a piercing location in the subject image with an accessory piercing point associated with the accessory. The accessory images and mattes may be rotated about the accessory piercing point to place the simulated accessory in the desired location, orientation and scale relative to the subject.

While the invention herein disclosed has been described by means of specific embodiments and applications thereof, numerous modifications and variations could be made thereto by those skilled in the art without departing from the scope of the invention set forth in the claims.

What is claimed is:

1. A non-transitory computer-readable medium comprising computer-readable instructions for simulating accessory display on a subject, wherein execution of said computer-readable instructions by one or more processors causes said one or more processors to carry out steps comprising:
   obtaining at least one subject image of a subject comprising at least one ear region of said subject;
   obtaining at least one ear accessory image of an ear accessory;
   generating at least one accessory foreground matte for said at least one ear accessory image;
   determining at least one accessory scaling factor based on at least one reference marker on said at least one ear accessory image and an inter-pupillary distance of said subject in said subject image;
   scaling said at least one accessory foreground matte using said at least one accessory scaling factor;
   generating at least one accessory background matte for said at least one ear accessory image;
   scaling said at least one accessory background matte using said at least one accessory scaling factor;
   generating a shadow layer based on said at least one accessory foreground matte image and said at least one ear accessory image;
   generating a subject background layer based on said subject image;
   generating an ear layer based on said subject image; and
   rendering a simulated image of said subject wearing said ear accessory by layering in sequence said subject background layer, a background portion of said at least one ear accessory image based on said scaled accessory background matte, said ear layer, a foreground portion of said at least one ear accessory image based on said scaled accessory foreground matte, and said shadow layer.

2. The non-transitory computer-readable medium of claim 1, wherein said at least one subject image comprises at least one professionally photographed image of a model.

3. The non-transitory computer-readable medium of claim 1, further comprising the step of displaying said at least one simulated image in association with marketing material for said ear accessory.

4. The non-transitory computer-readable medium of claim 1, further comprising the step of:
   generating a hair layer based on said subject image,
   wherein rendering said simulated image further comprises layering said hair layer.

5. The non-transitory computer-readable medium of claim 4, further comprising the step of determining an estimated head position, wherein selection of said accessory image is based on said estimated head position.

6. A method for simulating accessory display on a subject comprising:
   obtaining a subject image of a subject;
   obtaining at least one accessory image of an accessory;
   generating at least one accessory foreground matte for said at least one accessory, wherein said accessory foreground matte is adjustable based on lighting of said subject image;
   determining at least one accessory scaling factor based on at least one reference marker on said at least one accessory image and a reference size of said subject in said subject image;
   scaling said at least one accessory foreground matte using said at least one accessory scaling factor;
   generating at least one accessory background matte for said at least one accessory image, wherein said accessory background matte is adjustable based on lighting of said subject image;
   scaling said at least one accessory background matte using said at least one accessory scaling factor;
   generating a shadow layer based on said at least one accessory foreground matte and said at least one accessory image;
   generating a subject background layer based on said subject image;
   generating a subject foreground layer based on said subject image; and rendering a simulated image of said subject wearing said accessory by layering in sequence said subject background layer, a background portion of said at least one accessory image based on said scaled accessory background matte, said subject foreground layer, a foreground portion of said at least one accessory image based on said scaled accessory foreground matte, and said shadow layer.

7. The method of claim 6, wherein said accessory is selected from a piercing accessory, a shoulder accessory, an arm accessory, a neck accessory, a foot accessory, a wrist accessory and a finger accessory.

8. The method of claim 6, wherein said accessory is an ear accessory.

9. The method of claim 8, wherein said reference size is an inter-pupillary distance of said subject in said subject image.

10. The method of claim 6, wherein said at least one accessory foreground matte is generated by modifying a matte generated using at least one digital image processing technique.

11. The method of claim 6, wherein said obtaining said accessory background matte comprises modifying a matte generated using at least one digital image processing technique.

12. The method of claim 6, further comprising the step of:
generating a hair layer based on said subject image,
wherein rendering said simulated image further comprises layering said hair layer.

13. The method of claim 12, further comprising the step of determining an estimated head position, wherein selection of said accessory image is based on said estimated head position.

14. The method of claim 6, further comprising the step of displaying said simulated image in association with marketing material for said accessory.

15. The method of claim 6, wherein said subject image comprises a professionally photographed image of a model.

\* \* \* \* \*